Dec. 9, 1930.  E. MARTIN ET AL  1,784,697
CURRENT CONTROLLING OR INSULATING DEVICE FOR IGNITION SYSTEMS
Filed Oct. 18, 1927
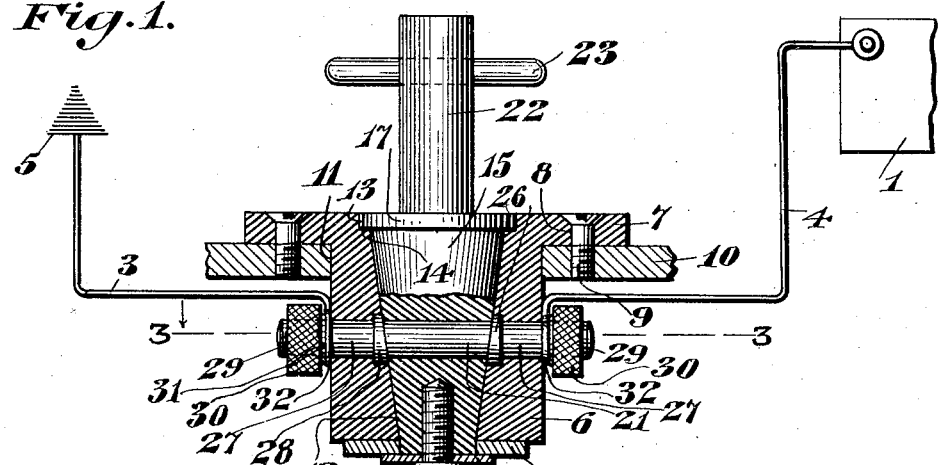
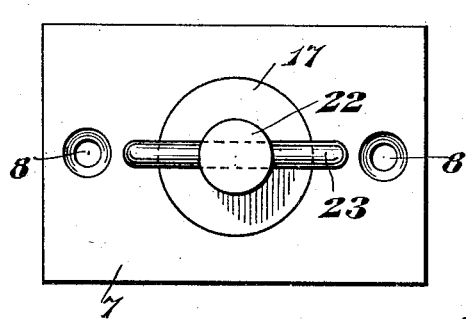
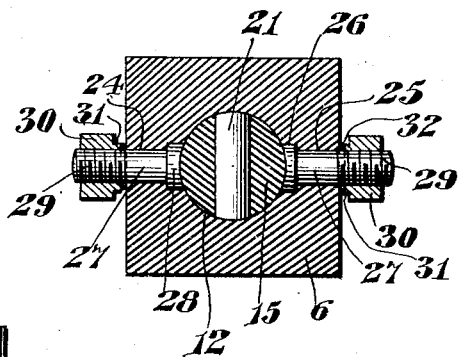
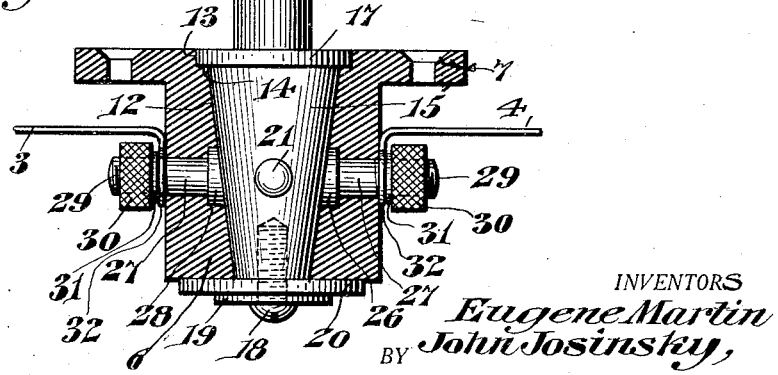
INVENTORS
Eugene Martin
John Josinsky,
BY
Geo. T. Kimmel
ATTORNEY.

Patented Dec. 9, 1930

1,784,697

UNITED STATES PATENT OFFICE

EUGENE MARTIN, OF FREEPORT, AND JOHN JOSINSKY, OF BAYSIDE, NEW YORK

CURRENT CONTROLLING OR INSULATING DEVICE FOR IGNITION SYSTEMS

Application filed October 18, 1927. Serial No. 226,993.

This invention relates to a circuit controlling or insulating device for ignition systems and has for its object to provide, in a manner as hereinafter set forth, a device of the class referred to for controlling the passage of the current of an ignition system to prevent and eliminate danger of fire, that might otherwise be caused by a defective cable, improper connections or a short circuit.

Further objects of the invention are to provide, in a manner as hereinafter set forth, a circuit controlling or insulating device for ignition systems which is simple in its construction and arrangement, strong, durable, compact, thoroughly efficient in its use, conveniently operated, readily installed and comparatively inexpensive to manufacture.

With the foregoing and other objects in view the invention consists of the novel construction, combination and arrangement of parts as hereinafter more specifically described, and illustrated in the accompanying drawings wherein is shown an embodiment of the invention, but it is to be understood that changes, variations and modifications can be resorted to which fall within the scope of the claim hereunto appended.

In the drawings wherein like reference characters denote corresponding parts throughout the several views:—

Figure 1 is a sectional elevation of a current controlling or insulating device, in accordance with this invention, showing the adaptation thereof with respect to an ignition system.

Figure 2 is a top plan view of the device.

Figure 3 is a section on line 3—3 Figure 1.

Figure 4 is a sectional elevation taken at right angles to Figure 1 of the device.

A current controlling or insulating device, in accordance with this invention, is adapted to be interposed in the circuit connection leading to ground from a source of power to be derived from a storage battery or other point. By way of example the ground connection is illustrated as extended from the negative pole of a storage battery 1. The ground connection is formed of two sections 3, 4 and the ground is indicated at 5. The section 3 terminates in the ground 5 and the section 4 leads from the negative pole of the battery 1. The device in accordance with this invention and for the purpose set forth is interposed between and coupled to the sections 3, 4 of the ground connection.

The device includes a body portion 6 formed of any suitable insulation material flanged at its top, as indicated at 7, and with the flange formed with openings 8 for the passage of holdfast devices 9, to fixedly secure the body portion 6 to a support 10. The body portion 6 extends through the support 10 and the flange 7 is seated on the latter. Preferably the body portion 6 is anchored and by way of example it is illustrated as being anchored to the support 10. The opening in the support, for the passage of the body portion 6, is indicated at 11.

The body portion 6 is formed with an opening of inverted truncated cone shape and which extends from the bottom to the top of said body portion and the wall of said opening is indicated at 12. The upper part of the wall 12 is offset as at 13, to provide a seat or shoulder 14. Extending through the opening formed in the body portion 6, is a plug 15 which corresponds in contour to the contour of said opening. The upper end of the plug 18 is formed with a lateral flange 17 which is seated in the offset upper end of the wall 12 of the opening in the body portion 6. The plug 15 extends through and depends from the body portion 6 and is retained on the shoulder or seat 14 by a holdfast device 18, a washer 19 and an apertured disc 20. The washer 19 abuts against the lower end of the plug 15 and the holdfast device 18 extends into said lower end of the plug 15 and through the washer 19. The disc 20 is interposed between the washer 19 and the lower end of the body portion 6 and surrounds the lower end of the plug 15. The plug 15 is formed of insulation material and has mounted therein and extending diametrically thereof a contact member 21 of conducting material which has its ends flush with the periphery of the plug 15.

Formed integral with and extending from the upper end of the plug 15, is a stem 22, carrying a handle member 23 which is disposed diametrically with respect to the stem 22. The handle member 23 facilitates the turning of the plug 15 in the body portion 6, when desired.

The body portion 6 is formed with a pair of diametrically disposed ports or channels 24, 25 each arranged concentrically with respect to and having its inner end communicating with a recess 26 formed in the wall of the opening 12 in the body portion 6. The ports or channels at their outer ends open at the outer periphery of the body portion 6. The recesses 26 are diametrically opposed with respect to the wall of the opening 12. The ports or channels are arranged in endwise opposed alignment with respect to each other, but in spaced relation at their inner ends, due to the fact that the inner ends of the ports or channels open into the diametrically opposite recesses 26. Mounted in each port or channel is a binding post 27 provided at its inner end with a head 28 which is seated in a recess 26 into which opens inner end of a port or channel. The rear face of the head 28 is flush with and conforms in curvature to the curvature of the wall of the opening 12 and in this connection see Figure 3. The ends of the contact 21 also conform in curvature to the periphery of the plug 15 and the latter conforms in curvature to that of the wall of the opening 12. See Figure 3. The binding posts 27 are in the form of headed bolts and which are of greater length than the ports or channels and project a substantial distance laterally in opposite directions from the body portion 6, as well as extending from opposite sides of the latter. The extending ends of the binding posts are peripherally threaded as indicated at 29. Mounted on the outer end of each of the binding posts and having threaded engagement therewith is a securing nut 30 having a reduced rear face as indicated at 31. The securing nuts 30 have knurled edges 32 to facilitate the shifting thereof. The securing nuts 30 are provided for binding the sections 3, 4 of the ground connection to opposite sides of the body portion 6 and in electrical contact with the binding posts 27. The ends of the sections 3, 4 which are secured to the body portion 6, are looped as indicated at 32 and extend around the binding posts and are clamped between the reduced inner faces of the nuts 30 and the body portion 6. See Figures 1 and 4.

The plug 15 is adapted to be shifted to have the contact 21 electrically engage with the heads 28 of the binding posts whereby the circuit will be closed, that is to say if the switch, not shown, for the circuit has been closed. When the plug 15 has been shifted to position the contact 21 out of engagement with the binding posts 27, the ignition circuit will remain open and will be in such position, until the plug 15 is shifted to electrically connect section 3 with section 4 of the ground connection leading to the ground 5. When the contact 21 is clear of the binding posts 27, the circuit is so controlled that it will prevent and eliminate any danger of fire, that might otherwise be caused by a defective cable, improper connections or short circuiting. The device is arranged in the ground connection and normally maintains the circuit open even though the circuit closer for the circuit has been shifted to closure position. The current will be prevented from passing or rather the circuit will be in an open one until the plug 15 is shifted to electrically connect the section 3 to section 4 of the ground connection. The device is positioned as closely as possible to the source of electrical energy, such as illustrated by way of example as a battery 1. The device provides means for cutting off the current irrespective of the circuit opening and closing element employed in circuit arrangements and by using the device for cutting off the current it will function for the purpose hereinbefore referred to.

It is thought the many advantages of a current controlling or insulating device for the purpose referred to and in accordance with this invention, can be readily understood, and although the preferred embodiment of the invention is as illustrated and described, yet it is to be understood that changes in the details of construction can be had which fall within the scope of the invention as claimed.

What we claim is:

A current controlling device for ignition systems comprising a body of non-conducting material provided at its top with an apertured lateral flange for the passage of holdfast devices to fixedly secure said body in position, said body formed with a centrally disposed tapered opening having the wall thereof intermediate its upper and lower ends provided with a pair of diametrically disposed recesses, said wall at its top being offset to provide a shoulder, said body further having a pair of oppositely disposed, endwise aligning channels disposed concentrically with respect to said recesses and extending from the latter to the outer periphery of said body, a pair of oppositely extending binding posts mounted in said channels and each having its inner end provided with a head seated in a recess and flush with the wall of said opening, said posts projecting from said body and carrying means on their outer ends for coupling the sections of the battery lead therewith, a tapered, rotatable plug of insulation extending through said opening and provided with a flange seated against said shoulder, a contact member mounted in and extending transversely through said plug, having its ends flush with the periphery of the latter for engaging said head to electrically connect said posts together, and means carried by said plug and coacting with the flange for coupling the plug to said body.

EUGENE MARTIN.
JOHN JOSINSKY.